(12) United States Patent
Durst, Jr. et al.

(10) Patent No.: US 10,504,143 B2
(45) Date of Patent: Dec. 10, 2019

(54) SYSTEM AND METHOD FOR PROCESSING ELECTRONIC DOCUMENTS

(71) Applicant: Silver Bay Software LLC, Dunstable, MA (US)

(72) Inventors: Robert T. Durst, Jr., Dunstable, MA (US); Kevin Doré Hunter, Middlesex, NJ (US)

(73) Assignee: SILVER BAY SOFTWARE LLC, Dunstable, MA (US)

( * ) Notice: Subject to any disclaimer, the term of this patent is extended or adjusted under 35 U.S.C. 154(b) by 781 days.

(21) Appl. No.: 14/936,381

(22) Filed: Nov. 9, 2015

(65) Prior Publication Data

US 2016/0132925 A1 May 12, 2016

Related U.S. Application Data

(60) Provisional application No. 62/123,216, filed on Nov. 10, 2014.

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0257* (2013.01); *G06Q 30/0267* (2013.01); *G06Q 30/0277* (2013.01)

(58) Field of Classification Search
USPC .............................. 705/14.4, 14.73
See application file for complete search history.

(56) References Cited

U.S. PATENT DOCUMENTS

| | | | |
|---|---|---|---|
| 2007/0066341 A1* | 3/2007 | Silverbrook | B41J 3/36 455/550.1 |
| 2014/0025538 A1* | 1/2014 | Kalgi | G06Q 30/0623 705/26.61 |

* cited by examiner

*Primary Examiner* — Sun M Li
(74) *Attorney, Agent, or Firm* — Schmeiser, Olsen & Watts LLP; Timothy P. Collins

(57) ABSTRACT

A system and method for online marketing, comprises reading, by an electronic device, a machine-readable code corresponding to an object of interest or interpreting one or more characteristics of the object of interest itself in order to identify it; generating a request to a designated computer server for content related to the object of interest in response to processing a decoded address on the machine-readable code or the value of the one or more characteristics of the object of interest; and outputting a link to the content or outputting the content itself to a device in response to a receipt of the request.

15 Claims, 6 Drawing Sheets

Widget Data Sheet

Thank you for using the system.

Documents may be downloaded using the following links:

Widget Data Sheet                   (65,871 bytes)
  Fiche de données de Acme Widget     (82,859 bytes)
  Hoja de Datos del Acme Widget       (76,968 bytes)

These documents are provided by Acme Widget Company, who is solely responsible for their content.

FIG. 6

SYSTEM AND METHOD FOR PROCESSING ELECTRONIC DOCUMENTS

CROSS-REFERENCE TO RELATED APPLICATIONS

This U.S. non-provisional patent application claims priority under 35 U.S.C. § 119 from U.S. Provisional Patent application Ser. No. 62/123,216 filed on Nov. 10, 2014 in the United States Patent and Trademark Office, the entire contents of which are hereby incorporated by reference.

FIELD

Example embodiments of the inventive concepts relate generally to the processing of electronic documents, and in particular, to the fetching of electronic documents related to an article, advertisement, or product for display on a computer device.

BACKGROUND

One well-known internet marketing technique includes the use of pay-per-click, where advertisers pay a fee each time an advertisement is clicked so that the user is directed to the advertiser's website, for example, in response to a search engine keyword search. Another marketing technique includes the use of website banner advertisements, where advertisers pay a fee for posting an advertisement for display at a website often based, in part, upon the volume and nature of user traffic on that website.

Mobile codes or so-called "two-dimensional' barcodes such as "Quick Response" (QR) codes, are also being used in mobile marketing campaigns. For example, an advertiser may mark a product or advertisement with a QR code containing a Uniform Resource Locator (URL). In the case of a "direct mobile code", when an image of the QR code is read or scanned using a device such as a mobile device or "smartphone" equipped with a camera, scanner, or related sensing device, the URL is decoded and output to that device's, or a device application's, internet browser or the like to connect to the designated web site via the URL identified in the QR code. Information from the website related to the product or advertisement is then transmitted back to the originating device and displayed on the originating device.

In another example, the mobile code may only contain an index identifier of the object of interest, a product or advertisement, instead of a full URL, often referred to as "managed mobile code." When the index is decoded, it is incorporated as an element of a URL that is then formatted for a predetermined or designated web address by software stored at and executed by the originating device, e.g., the user's smartphone, laptop, or electronic notebook. This URL is then transmitted electronically by the device to the designated website. A process at the website may parse the index from the URL and use the index value to look up one or more associated web addresses. The designated website can then look up and send this associated information back to the originating device, which displays the information. Alternatively, the designated website can send the associated web addresses back to an originating device with a "redirect command," whereby the originating device itself may then retrieve the associated information from the designated address. Once this information is retrieved, it is then displayed on the originating device's display.

BRIEF SUMMARY

In accordance with one aspect, a method for online marketing, comprises reading, by an electronic device, a machine-readable code corresponding to an object of interest or interpreting one or more characteristics of the object of interest itself in order to identify it; generating a request to a designated computer server for content related to the object of interest in response to processing a decoded address on the machine-readable code or the value of the one or more characteristics of the object of interest; and outputting a link to the content or outputting the content itself to a device in response to a receipt of the request.

In accordance with another aspect, a system processing electronic documents, comprises a machine-readable code corresponding to an object of interest or interpreting one or more characteristics of the object of interest itself in order to identify it, the code readable by an originating electronic device; a computer processor that generates a request to a designated computer server for content related to the object of interest in response to processing a decoded address on the machine-readable code or the value of the one or more characteristics of the object of interest; and a computer processor that sends a link to the content to a device or sends the content to the device or location in response to a receipt of the request.

In accordance with another aspect, a method for online marketing comprises marking an advertisement with a mobile code; reading by a mobile camera phone the mobile code; determining by a designated server if the mobile camera phone sends a request that can be processed by the server; and outputting a link to the content or outputting the content itself to a service accessible by at least one electronic device or to a device itself.

BRIEF DESCRIPTION OF THE SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts.

FIGS. 5 and 6 are screenshots of email messages displayed at a user electronic device, in accordance with some embodiments.

DETAILED DESCRIPTION

Figure 1:
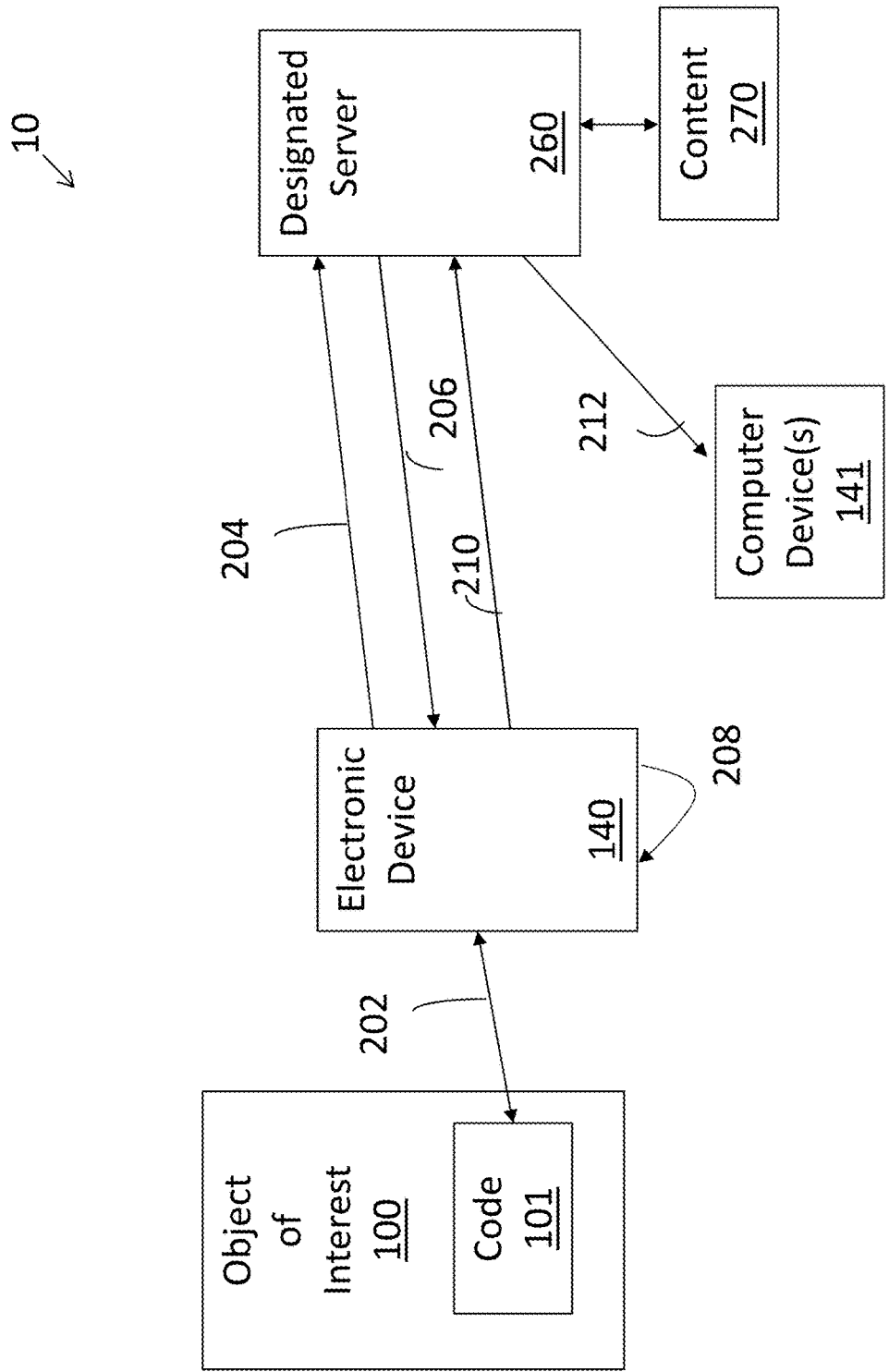
FIG. 1 is an illustrative view of a system in which electronic documents are processed, in accordance with some embodiments.

Mobile electronic devices are typically limited with respect to their ability to display certain content and allow facile interaction to occur with retrieved information. This limitation is generally due to the interactive nature of the current QR paradigm that requires a user to wait for the user's originating device to connect to a designated server, and to display information associated with a QR code on the same device that scanned the code, e.g. the user's smartphone. For example, conventional QR retrieval requires the user to wait for a server response, thereby interrupting current device activity, and to use the same device to view the content used to originate the request by scanning the QR code. This can prove inefficient due to delays and lags in information retrieval inherent in the system and also limits the type, format, and "richness" of the retrieved information that can be displayed based upon the limitations of the scanning device.

Other limitations relate to limitations of the interface of the originating device, e.g. screen size, button size, lack of physical keyboard, etc. For example, mobile device displays are often small, have a limited spatial and color resolution, and may not be equipped with appropriate software to render retrieved content optimally. These limitations often require the reformatting of information so that it is appropriately formatted for a given mobile device. For example, some mobile devices do not support Adobe™ "flash" content, and therefore, information from some websites may not be properly displayed. This often requires that multiple formats be specified and supported for a range of mobile devices, as well as the capability to identify which device will be displaying the requested material so that appropriately formatted content can be transmitted. Idiosyncrasies of specific mobile devices with respect to operating systems, internet browser features, or other display-related differences also require that a device be identified in order to assure that appropriate input be designated for each format.

In brief overview, embodiments of the present inventive concepts provide information associated with objects of interest designated using originating devices that do not suffer from the display, interface, compatibility, or session limitations with respect to mobile devices.

In contrast to conventional solutions where a computer device displays the content associated with a URL to the device in direct response to the device scanning a QR code that includes the URL, embodiments of the present inventive concept instead permit the content to be delivered to the user's electronic device display by sending a link to the user via email or other preferred form of electronic communication. The form of electronic communication can be established by output information associated with the originating device and/or the user of that device, which includes an email address, fax number, postal and/or other address information so that materials associated with an indicator of the object of interest to one or more of these addresses in formats defined by a content provider and, optionally, selected by user preference. For example, documents associated with a processed QR code may be stored at a database or the like so that the links displayed on a received email message may be used to retrieve those documents.

In addition, the requested content associated with the QR is sent to the designated email address asynchronously, and not while the user waits for it from the server. For example, a user asynchronously requests information by expressing interest in an item by scanning a QR code corresponding with the item, and then continuing with what the user was doing, i.e., no "session".

Along these lines, embodiments of the present inventive concepts execute an out-of-band exchange, i.e., not to the originating device but to a designated email address that can be read on multiple electronic devices capable of reading email, for example, one or more of an email designee's smartphone, laptop computer, desktop computer, and electronic notepad. Since returned email information from a service in which a user's device is registered may be viewed and processed on devices other than the originating device, i.e., the device performing a scanning operation on the QR code, whereby the other device may poll the service, e.g., email server, the limitations described herein with respect to conventional approaches, e.g, direct or managed mobile codes, do not apply. In some embodiments, during operation an advertising party may mark an advertisement with a machine-readable label, spatial pattern, or matrix code such as a QR code so that when it is read by a camera, scanner, or other sensing device in communication with a mobile device, a server identified by the QR code, e.g., a URL decoded in the QR code, first determines if the camera phone and/or the user of the camera phone is registered with a service, e.g. by detecting and reading a browser "cookie" stored on the device, and then sends a PDF brochure, or an email with a link to a PDF brochure, associated with that code to the email associated with that registered device and/or user.

When a device is registered with a service, the device is recognized and known to the designated server, since a cookie is present at the originating device. Thus, when the server is contacted, if a cookie is present then the stored email address may be used to identify the user of the device. Being "registered" in this manner provides the advantage of prepopulating the email address where the requested content will be sent unless it is replaced by the user. If an identifier is also passed with the cookie, then detecting the cookie and mapping it to an identity in the database could also be used to create and manage additional device features, such as multiple email addresses and device profile features previously collected (e.g. via a profile session on webpage). If a user can also be uniquely identified on the device using a biometric confirmation (e.g. the "thumbprint identifier" on the iPhone) or an "infometric" data (e,g, a password) then users could be identified by the server and interact independently of an originating device.

If after scanning the QR code the designated server determines that the camera phone and/or user associated with the camera phone is not registered with a service, then the server can send a form back to the camera phone that allows the user to register with the service, in which the user can identify the location, e.g., email address, where the associated content may be sent, and in which other devices may subsequently receive URL links and/or content. The user may also specify and opt in to provide associated demographic and psychographic information associated with current and future requests.

For example, information provided with an indicator provided as part of a cookie from the mobile electronic device of the user to the designated server may include object of interest (OI), device and/or user status information conveyed to the server as information for example, the QR code number that was associated with a given document set but which also indicated which QR code had requested a given document set (say for an advertisement in different publications to distinguish response). Information regarding the device might include its location (GPS), time of day, etc. Information regarding the state of the user might include their heart rate to indicate, say, their state of "arousal" (e.g. to gauge reaction to the advertisement).

Upon completion of the registration process, content associated with the designated object of interest can then be sent to the user's specified email according to user-specified criteria. Therefore, in contrast to conventional QR codes that connect a user's smartphone to a web page, embodiments of the present inventive concepts deliver interested viewers an email or the like with links to the content so that the viewer can view it at a future time, and in a user-specified format, for example, permitting the user to select which format to view the received content.

One advantage of this approach in accordance with some embodiments is that it overcomes the display limitations of the originating device since the associated content can be sent in a richer format consistent with the means specified, or the device that receives the requested content, to retrieve and display the associated document. One example is that content could be sent in Flash, even if the requesting device was an iPhone that did not support display of flash information in the requested email. Retrieved content can comprise both static and dynamic PDFs, multimedia, HTML documents and web sites (including support for scripting and interactive forms), print material, facsimile pages and/or audio material.

Another advantage of this approach is that if a marketing result, for example, documentation in response to a selection of a link provided in an email message sent to the requester, is not in a format supported by the requester's computer device, e.g., PDF, then it can be viewed from another device that supports the format.

Another advantage of this approach is that allows the use of a full range of user interface options to interact with the associated content including full size keyboards, mice and other pointing devices, graphical tablets, web cameras, voice, speech recognition, etc.

Another advantage is that it does not limit the retrieval of associated information to a "session dialog" where the user must wait for the display of associated content after designating an object of interest. Instead, according to embodiments of the inventive concepts, a user may use a mobile electronic device to designate objects of interest in real time and then later retrieve and review the objects associated with those items of interest at a later time sent to them via email or other means. A user may also review this content on the same device equipped with an appropriate communications channel and display software, for example, permitting a viewer to read a received email message on the requesting device such as an Apple iPhone™ mobile electronic device equipped with email and a Safari™ web browser.

For example, the systems and methods do not rely on a website to load content onto a user's smartphone, since content is retrieved in response to the user selecting a link to the content in an email message or other electronic communication, whereby the content associated with the link is provided electronically to the designated email address.

Another advantage of this approach is that it facilitates easy adoption by non-registered users via a registration dialog with the server once a non-registered user has been detected.

It should be noted that if the associated information is sent to a user's computer device in a format such as 'email', then it may also be viewed by the user on the originating device using an email application on the originating device.

FIG. 1 is an illustrative view of a system 10 in which electronic documents are processed, in accordance with some embodiments.

Figure 4:
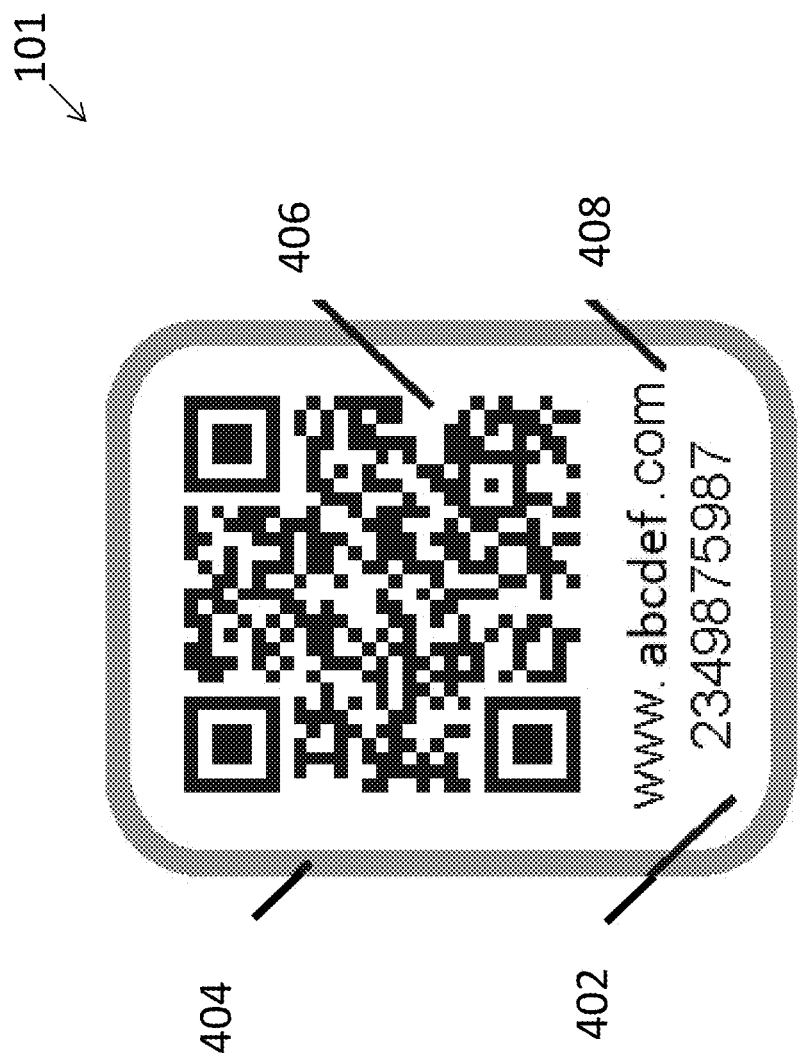
FIG. 4 is a view of a machine-readable label, in accordance with some embodiments.
Figure 5:
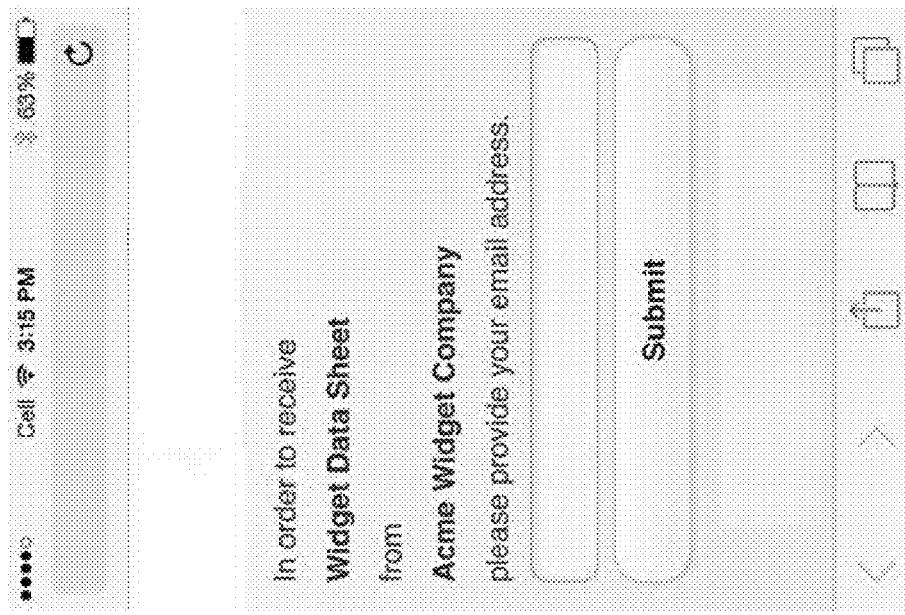

An electronic device 140, for example, a smartphone, personal computer, or other electronic device, includes a display and an imaging device such as a camera, scanner or the like and a decoder for processing (202) images of a machine-readable code 101, label, spatial pattern, or matrix code on an object of interest 100, such as an advertisement or product of interest to a user, for example, shown in FIG. 4. The code 101 may include a QR code or the like that is encoded with a URL or the like that identifies the address of a special purpose computer such as a server 260, or database 240 or the like from which content can be transmitted via a network or other electronic communication to an electronic device of choice. Other modalities that require either demodulation, interpretation, or the otherwise recognition of information on or related to an object of interest may equally apply such as a barcode, digital watermark, spatial pattern, image recognition, optical character recognition (OCR), audio, radio frequency identification (RFID), or other explicitly modulated coding methods and interpretive recognition techniques, including without limitation those which can be decoded by a decoding technology, such as NeoReader™ by NeoMedia Technology, Inc., i-Nigma™ by 2GVision, and so on. In yet other embodiments, QR code alternatives may be implemented, such as microPDF elements used in some software applications FIG. 4 illustrates one example of a machine readable code 101 which may include but not limited to a human readable index 402 that could be manually entered by a user to request documents related to that code, a graphic border 404 delimiting the code area, machine readable code 406 containing a server URL and index value 402, and (408) a human readable URL 408 of the server used to process the code that could be manually entered. The electronic device 140 executes the received URL, and generates and outputs (204) a request to the designated server 260 identified in the URL in the QR code. As described with respect to embodiments herein, the request may include an indicator comprising one or more optional record fields. In response, the server 260 outputs (206) a form (for example shown in FIG. 5) that is presented on the display screen of the device 140, which can be completed (208) by the user of the electronic device 140, for example, entering an email address or other information requested in the form in an electronic format, for example, shown in FIG. 5. The completed response is output (210) to the designated server 260 where it is processed. The server 260 in response may provide (212) a link to the content in a marketing email message to any computer device configured to receive and read the email message, which may include electronic device 140 and/or other devices 141 (as shown) such as a smartphone, laptop computer, desktop computer, electronic notebook or pad, and so on, according to the information in the response data entered in the form in step 208, for example, shown in FIG. 6.

The following is an example of a URL of a QR code, in accordance with some embodiments:

HTTP://M.ABCCORP.COM/M/12345678, where: M.ABCCORP.COM" refers to the domain name of the "designated server" (260) portion of the service that manages the content to be provided in response a request. "/M/" refers to the URL identified as associated with a QR code, and "12345678" is a unique numerical identifier of the QR code. The numerical identifier for the QR code is an index of that particular code in the database.

Figure 3:
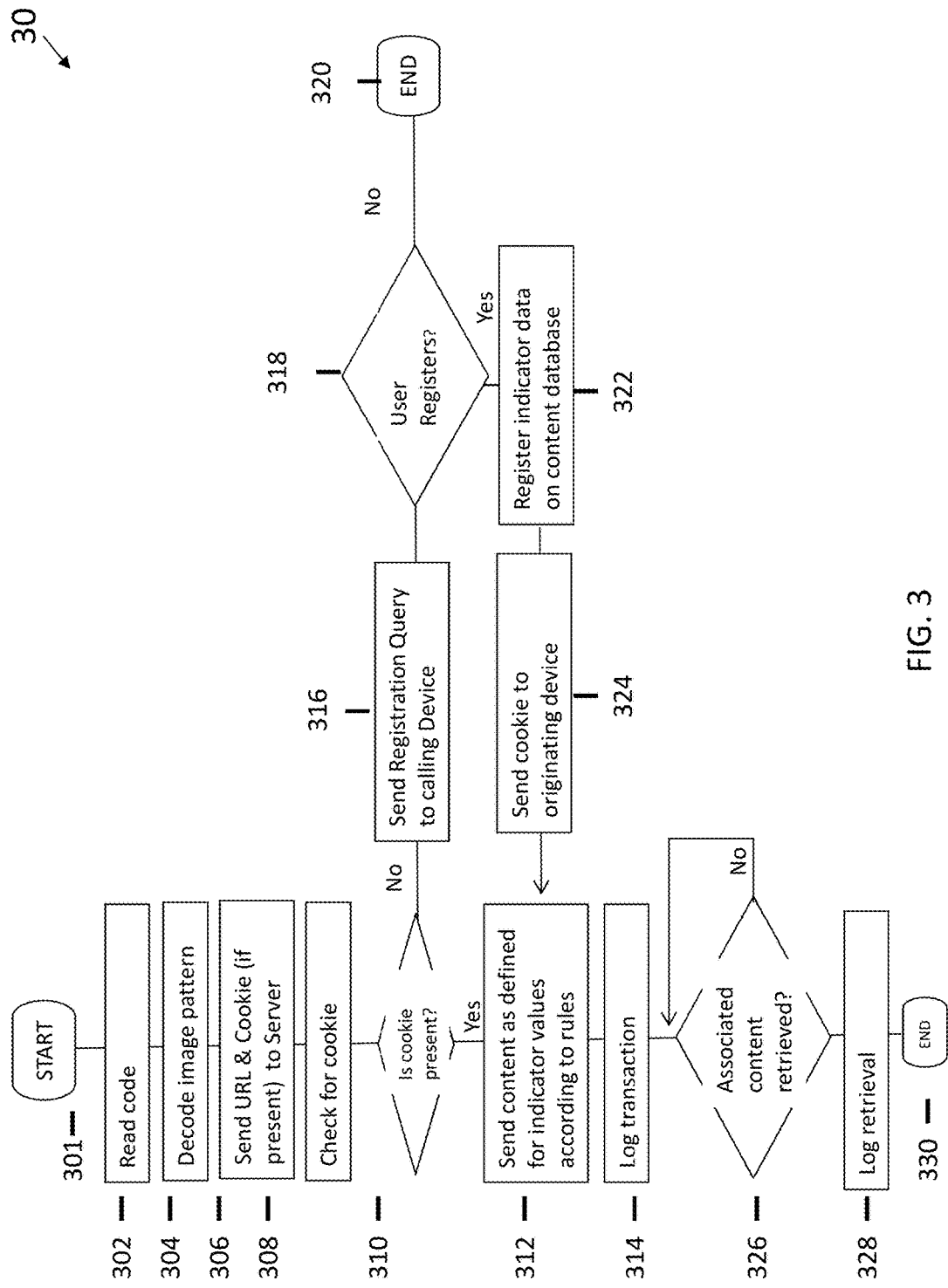
FIG. 3 is a flowchart of a method for processing electronic documents, in accordance with some embodiments.

When the user first uses a particular service, a cookie isn't present (see FIG. 3 details). Here, an HTTP request (204), for example, including a URL, that the server 260 may receive may be structured as follows.

```
GET /M/12345678 HTTP/1.1
Host: M.ABCCORP.COM
[blank line]
```

As described herein, some embodiments include the absence of a cookie. Here, the server 260 may return (206)

a blank form, i.e., not populated with an email address or other data that may be derived from the presence of a cookie. Here, the user may enter the requested information, e.g., email address, and submit it (210) to the server 260. An acknowledgement, for example, "thank you" message, may be sent from the server 260 to the originating device 140, for example:

```
HTTP/1.1 200 OK
Content-Type: text/html
Content-Length: [some integer here]
Set-Cookie: email=myemail@example.org; domain=ABCCORP.COM; path=/
[blank line]
[beginning of the 'thank you page HTML here]
```

Here, a cookie can be configured with the email address (for example, shown below), and content can be subsequently sent (212) to the designated email address.

Returning to the exchange description, upon a second use of the service, if the cookie is still present in the browser's cookie store, the next time a QR code is scanned, the request include a "Cookie" header, for example:

```
GET /M/12345678 HTTP/1.1
Host: M.ABCCORP. COM
Cookie: email=myemail@example.org
[blank line]
```

Figure 2:
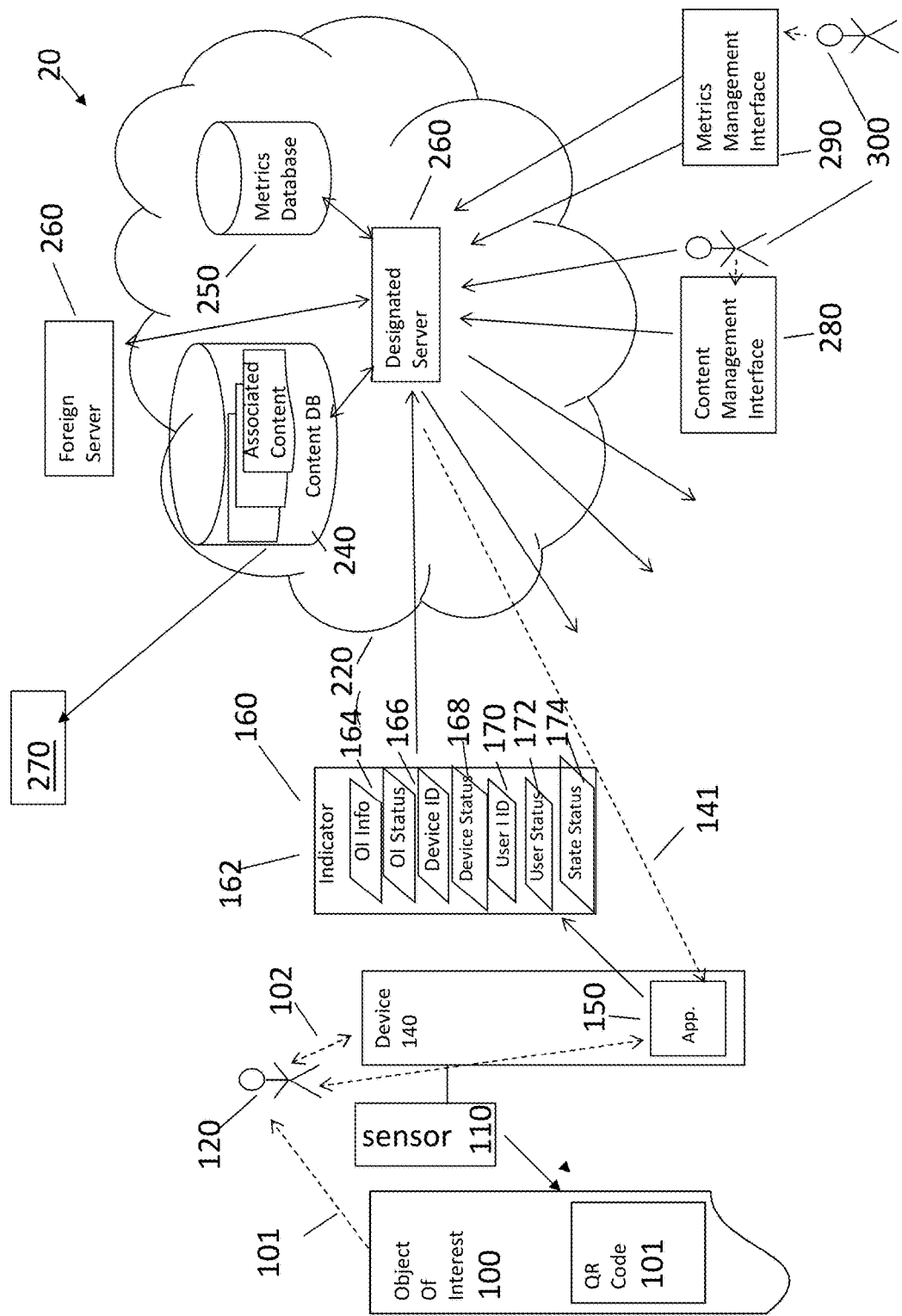
FIG. 2 is a detailed illustrative view of an environment in which electronic documents are processed, in accordance with some embodiments.

FIG. 2 is a detailed illustrative view of an environment 20 in which electronic documents are processed, in accordance with some embodiments.

The environment 20 includes an object of interest 100, for example, an advertisement or product, and a sensor 110 that is either attached to or part of an originating electronic device 140, for example, a camera equipped mobile phone, or a physically attached barcode scanner or the like. In some embodiments, the sensor 110 is an optical sensor. In some embodiments, the sensor 110 is an audio sensor. In some embodiments, other sensor 110 modalities are provided individually or in combination, such as temperature, radiation, etc.

The environment 20 includes at least one designated server 260 constructed and arranged to receive and process an indicator 162 (described in detail below), or database record with optional elements, from the electronic device 140 either by a direct (not shown) wired and/or wireless data connection or over a network 220 as shown to a content database 240 that contains associated content 270 and instructions on which content to send and how to route the selected content to one or more delivery addresses based upon a conditional assessment of information contained in the indicator 162 as defined by a user 300 using a content management interface 280 that accesses the server 260 either directly or over a network 220. In some embodiments where there are multiple servers 260, a user 300 may administrate the service on one server, and another server services requests from a user, for example, user 120. The content management interface 280 in some embodiments can be part of the user electronic device 140, or in other embodiments is executed by a different computer than the user electronic device 140.

In some embodiments, the indicator 162 may be delivered from the user electronic device 140 to the designated server 260 in an HTTP request message or the like. In some embodiments, for example, shown in FIG. 2, the indicator 162 may include one or more of, but not be limited to, data elements such as object-of-interest information 160, e.g. the decoded URL from a QR mobile code, object-of-interest status information 164, e.g. the color of a mobile code, device-ID information 166, e.g. a mobile browser cookie with identification information, device-status information 168, e.g. assisted GPS (AGPS) location, user-ID information 170, e.g. a user name string, user-status information 172, e.g. user heart rate, and/or state-status information 174, e.g. a time/date stamp for creation of the indicator 162 and/or other identifier such as International Mobile Equipment Identity (IMEI).

The server 260 may also be connected, either directly or over a network 220, to a metric database 250 that collects and logs indicator 162 related traffic and information regarding the routing of associated content 270 that can be accessed, analyzed and managed by a user 300 using a metrics management interface 290 that has access to the server either directly or over a network 220. The user 300 of the content management interface 280 and the metrics management interface 290 may be the same user or different users.

The server 260 may also be connected, either directly or over a network 220, by means of an Applications Programming Interface (API) or equivalent so that the server 260 may communicate indicator 162 information and/or other metric information to a foreign server 260.

In some embodiments, an object of interest 100 is interpreted according to either algorithmic and/or heuristic criteria by the application 150 running on the originating device 140, or remotely on a server 260 to produce definitive OI information 160. For example OCR encoding, image abstraction and/or classification and/or interpretation, other pattern matching, digital watermarking and classification of any other static or time varying object and/or signal (e.g. Audio, etc.).

In some embodiments, one or more spatially coded symbols are printed on an object of interest 100, or printed on a label or the like attached to the object 100, and are read 101 by a user 120 and then manually entered 102 into an originating device 140 as object-of-interest information 160.

In some embodiments, a user 120 is associated with an originating device 140 by a entering a user ID and optional password.

In some embodiments, a user 120 is associated with an originating device 140 by means of a biometric, e.g. a fingerprint.

In some embodiments, a user 120 is associated with an originating device 140 by a physically (e.g. a 'dongle' cable) or logically (e.g. via Bluetooth) connector. The user 120 may be proximate to the device, established by the device sensing a presence of a smart watch, band, ring or related device that can be enabled by such sensing. Here, user-ID information element 170 may include a value corresponding to a user identifier establishing the user's wearing of the smart watch or the like.

In some embodiments, there is no user 120, and an autonomous or automatic operation may be performed.

In some embodiments, the application 150 runs on the originating device 140.

In some embodiments, the application 150 runs remotely and the originating device 140 mediates the user input and display interface (e.g. as a 'terminal').

In some embodiments, the application 150 runs remotely and the originating device 140 mediates the user input and display interface but performs some local processing (e.g. as a 'thin client').

In some embodiments, the application 150 runs remotely and the originating device 140 mediates the user input and display interface (e.g. a 'thin client').

In some embodiments, the server 260 is a web server and communications is accomplished using http and html protocols or their successors.

In some embodiments, the server 260 is an SMS server and communications are accomplished using SMS protocols or their successors.

In some embodiments, the server 260 is a datagram protocol server and communications are accomplished using a datagram protocol.

In some embodiments, the server 260 is a session protocol server and communications are accomplished using a session protocol.

In some embodiments, the communications are asynchronous.

In some embodiments, the communications are synchronous.

In some embodiments, the content database 240 and the metrics database 250 are separate.

In some embodiments, the content database 240 and the metrics database 250 are combined.

In some embodiments, indicator 162 information 160, 162, 164, 166, 168, 170, 172, 174 alone or in combination is stored on the originating device 140.

In some embodiments, indicator 162 information 160, 162, 164, 166, 168, 170, 172, 174 alone or in combination is stored on the server 260.

In some embodiments, indicator 162 information 160, 162, 164, 166, 168, 170, 172, 174 alone or in combination is stored on both the originating device 140 and the server 260.

In some embodiments, associated content 270 is sent as a document.

In some embodiments, associated content 270 is sent as a link to a document formatted in another message.

In some embodiments, the content management interface 280 is a web service running on the server 260.

In some embodiments, the content management interface 280 is an application on a separate device in communication with the server 260 either through a direct connection of over a network 220.

In some embodiments, the content management interface 280 is a 'thin client' providing interface and display information to a user 300 on a local device in communications with the server 260 either through a direct connection of over a network 220.

In some embodiments, the content management interface 280 is a process that does not require a user 300.

In some embodiments, the metrics management interface 290 is a web service running on the server 260.

In some embodiments, the metrics management interface 290 is an application on a separate device in communication with the server 260 either through a direct connection of over a network 220.

In some embodiments, the metrics management interface 290 is a 'thin client' providing interface and display information to a user 300 on a local device in communications with the server 260 either through a direct connection of over a network 220.

In some embodiments, the metrics management interface 290 is a process that does not require a user 300.

FIG. 3 is a flowchart of a method 30 for processing electronic documents, in accordance with some embodiments. The method 30 can be performed by one or more elements of the system 10 and/or environment 20 illustrated in FIGS. 1 and 2, respectively. Reference is therefore made to the elements illustrated in FIGS. 1 and 2.

At block 302, a user 120 operates an originating device 140 to read a machine-readable code 101 on or associated with an object of interest 100. For example, the user 120 may operate a mobile camera phone or other device having an imaging device such as a camera or scanner that can capture an image of the code 101 having a QR code printed as an element of a magazine advertisement or directly attached to a product of interest. In some embodiments, the item itself may be used for identification or recognition, or other modalities. The user 120 may be the same as or different than users 300 of the content management interface 280 and the metrics management interface 290, respectively.

At block 304, the image pattern is decoded by the originating device 140. For example, the decoded QR code of the code 101 may include a URL or the like that specifies an internet address of a server 260 from where content related to the object of interest 100 may be accessed and/or delivered electronically to a location specified by the user 120, such as an email address. At block 306, a request is made for data to the designated server 260 identified in the URL in the QR code for predetermined content. An application 150 executing on or mediated by the originating device 140 may process the image generated from the sensor data and, in conjunction with other information, such as color of the QR code, device information, user information, and so on, may produce an indicator 162 that is output to an address of a server 260 that is either known prior as a default value, specified in the object-of-interest information 160, or selected predicated upon information in the indicator 162 or based on contents of other information elements 160, 164, 166, 168, 170, 172, alone or in combination, such as device status 168, e.g., originating device location. Indicator elements may be generated from device parameters, application 150 queries to other information sources, and/or other data received from other sources. In particular, the server 260 may receive some or all of the indicator 162 and extract one or more informational elements 160, 164, 166, 168, 170, 172, for processing as parameters used by the content database 240 to identify and route associated content 270 in appropriate format and through communications channels specified under program control using the content management interface 280.

For example, a QR code and/or content of an indicator element may be mapped to a given document set. However, this mapping arrangement is not limited thereto. For example, a document set may be mapped based on other characteristics such as a device location by executing a rule processed at the server 260 or other processing device. Another approach is to set up different document sets mapped to different identifier values (e.g. the QR identifier, device location, etc.) to implement the conditional logic without processing rules.

In addition to the application 150, the originating device 140 may include an HTTP browser or the like that is stored in memory and executed by a processor, and which generates an HTTP request message that is output to the server 260 that includes all or some of the information 160, 164, 166, 168, 170, 172 in the indicator 162, which may be rendered as data elements of an electronic 'cookie' sent with the message. This may apply to embodiments where the browser is a separate application or where the browser functionality is part of application 150.

At block 308, the server 260 may determine whether the originating device 140 is registered with a service, whereby the requesting device is recognized by the server 260 so that the correct email address can be prepopulated in the form. This can be achieved by the server 260, in response to the request made at block 306, detecting and reading a browser "cookie" stored on the device.

At decision diamond 310, a determination is made by the server 260 whether a cookie including a device identification element is present, which may be established by reading the request. If the server 260 establishes that no cookie is present, then the method 30 proceeds to block 316, where the server 260 sends a registration query to the originating device 140, for example, shown in the screenshot of FIG. 5, where the field for entering the email address is blank. When the user enters the email address, a cookie including the email address is sent to the server 260. More specifically, the server 260 may send an AJAX coded form page to the device 140. This form is then completed by the user 120 including at least a destination address and optionally such parameters as preferred associated content 270 format (e.g. send as a PDF document), a user ID 170, and user preferences/status (e.g. preferred language) 172. This completed information is then sent back to the server 260 which then completes the device registration and forwards the relevant associated content 270 as specified. This completed information may also be stored on the server 260 or storage device in communication with the server 260 and associated with the user to characterize future transactions, meaning that a "user ID" may be stored on both the server 260 and in the cookie in order to associate the information. Alternatively, all the information, for example, email address, is stored in the cookie and the absence/presence of the cookie determines whether the device has requested information from the server in a prior call. Although content 270 is referred to in some embodiments as electronic documents, other forms of content can equally apply. An entry can also be made at the metrics database 250.

Accordingly, at decision diamond 318, the user may register with the service by completing and submitting the electronic registration form. If the user does not register, then the method 30 ends (320). Otherwise, the method 30 proceeds to block 322 where the indicator data received in step 306 is registered at the content database 240. At block 324, a cookie is sent to the originating device 140. The cookie may include an object of interest identifier so that the server 260 can determine the associated document, or other content, to be provided to the user, for example, as an email message, fax message, physical delivery, and so on.

Returning to decision diamond 310, if a cookie is present in the request made at block 306, then at block 312 the server 260 may read the cookie present on the server 260 from the HTTP request message header. The server 260 may retrieve informational elements from the cookie regarding a unique advertisement ID in the QR tag 160 and the server 260 address, a unique device identifier in the cookie and/or a standardized IMEI or ESN of the originating device 166, the current location of the originating device in AGPS derived latitude and longitude coordinates 168, an ID for the user using the device 170, and the time and date of the request 174. Also, if a cookie is present, then it is detected and the email address provided as an element of the cookie may be prepopulated in the message displayed at the electronic device(s) receiving the email, for example, provided in the field shown in FIG. 5.

The server 260 process these values in search arguments submitted to the content database 240 that may first determine optionally if the device ID 166 is present and registered with the server 260 and, if it is, then determines what associated content 270 should be sent based on the associated scanned code in the content database, along with required format, routing information, and/or related data. As described herein, other delivery options may equally apply, such as a fax, automated phone call, video, physical package, and so on. For example, a physical sample corresponding to an advertisement or the like based on a characteristic such as a postal code or USPS address. The metrics database 250 may be updated accordingly by the server 260.

In embodiments where there is no device ID 166, server 260 determines if a cookie is present or not. If yes, then there is no previous call so the server simply uses the email address or the like in the cookie to prepopulate the email form (illustrated at FIG. 5). If there is no cookie then the server 260 assumes that this is a new query and sends a blank form to solicit an email address or other communication identifier to where the content may to be sent from the user. The server then sets a cookie on the device with that email address (for future reference) and notes the transaction in the metric database. In other embodiments other informational elements of 162 could be: (1) stored on the server as a registration record; (2) stored in the cookie; (3) used as arguments to determine the content to be sent to the user via email (etc.). For example, a user scanning an advertisement with a QR code in a magazine in Boston might be emailed different content than one scanning the same code in the same magazine in San Francisco (e.g. the stores where the product was available).

Returning to block 312, content is sent as defined for indicator values via a content management interface 280 that manages the content database by uploading and/or linking to associated content 270. Rules may be established for different indicator parameters, for example, governing associated content 270 and routing information determined by information 160, 162, 164, 166, 168, 170, 172, 174 alone or in combination as conveyed to the server 260 by the indicator 162. The content management interface 280 can be provided by a dedicated application running on a local device either directly connected to the server or connected by means of a communications network. It can also by a web service running on the server 260.

For example, using a web based campaign manager 280 an automobile manufacturer 300 uploads PDF formatted brochures on new vehicles to the content database. The identifier in the QR code is mapped to a document set with a Spanish version of a document in it. An email or other communication can be generated with a link to the Spanish version of the document in response to the user request.

At block 314, metrics associated with the transactions are stored in the metrics database 250. When a code 101 is scanned, an entry may be made in the metrics database 250 showing characteristics such as time/data of the scan, which code was scanned, which email the information was sent to and (later) ancillary information such as color of the code, AGPS location of the scan, biometric token for the user, and so on. Additional entries may be made to the metrics database 250 for when the user asks for an email from the service at which the user device is registered, and when the user selects a link to download a document.

Referring again to FIG. 2, a metrics management interface 290 may be provided by a dedicated application running on a local device either directly connected to the server or connected by means of a communications network 220 a service provider or their agent can search, analyze and data mine these metrics. This metrics management interface 290 can also by a web service running on the server 260. For example, a service provider logs onto a metric management interface 290 web service and proceeds to conduct data analysis regarding which print advertisements 100 are the most in which magazines campaigns.

Although the description provided contains many specificities they should not be construed as limiting the scope of the invention but rather as merely providing illustrations of some of the embodiments of this invention.

What is claimed is:

1. A method for processing electronic documents for online marketing, comprising:
    processing, by a first electronic device, a machine-readable code corresponding to an object of interest or interpreting one or more characteristics of the object of interest itself in order to identify it to designate a computer server for content related to the object of interest that may be accessed and delivered electronically to a specified second electronic device;
    generating and outputting from the first electronic device, a first request to the designated computer server for the content related to the object of interest to be received asynchronously with respect to the first request in response to processing by a decoder of the first electronic device a decoded address on the machine-readable code or a value of the one or more characteristics of the object of interest;
    in response to the first request, generating and outputting by the designated server to the first electronic device a second request for identifying the second electronic device for processing the content; and
    outputting, by an out-of-band asynchronous electronic communication between the designated server and the specified second electronic device, a link to the content or outputting the content itself to the second electronic device identified in the response to the second request, wherein the second electronic device is configured to process the content independently and regardless of whether the first electronic device is capable of processing the content.

2. The method of claim 1, wherein determining whether the electronic device is registered with a service is established by detecting the presence or absence of a browser cookie or identifier stored at the electronic device.

3. The method of claim 2, wherein the device identifier includes the electronic device's IMEI.

4. The method of claim 1, wherein the first request includes an indicator used by the server for processing the content.

5. The method of claim 4, wherein the indicator includes one or more of an object-of-interest data element, an object-of-interest status data element, a device-ID data element, a device-status data element, a user-ID data element, a user name string, a user-status data element, or state-status information.

6. The method of claim 1, wherein the machine-readable code includes a Quick Response (QR) code.

7. The method of claim 1, wherein the object of interest includes at least marketing material related to a product of interest.

8. The method of claim 1, further comprising:
    sending the content in a separate delivery in response to a selection of the link.

9. The method of claim 1, further comprising: determining by the computer server whether the electronic device is registered with a service; and sending a link to the content or sending the content in an electronic communication to the identified device in response to a determination that the user is registered with the service and in response to indicator data in the first request.

10. The method of claim 1, wherein the content associated with the machine-readable code is sent to a designated email address asynchronously.

11. The method of claim 1, wherein the device receiving the link to the content or the content itself is different than the electronic device.

12. The method of claim 1, wherein the first electronic device is an originating device capable of both requesting the content and receiving the content asynchronously by executing another program different than the program sending the first request, wherein the other program in response retrieves the content.

13. A system for processing electronic documents, comprising:
    a machine-readable code corresponding to an object of interest or an apparatus interpreting one or more characteristics of the object of interest itself in order to identify it to designate a computer server for content related to the object of interest that may be accessed and delivered electronically to a specified second electronic device, the code readable by an originating electronic device;
    a computer processor that generates and outputting from the first electronic device a first request to a designated computer server for the content related to the object of interest to be received asynchronously with respect to the first request in response to processing by a decoder of the first electronic device a decoded address on the machine-readable code or the value of the one or more characteristics of the object of interest and in response to the first request receives a second request from the designated server to identify another electronic device for processing the content; and
    a computer processor that sends by an out-of-band asynchronous electronic communication between the designated server and the specified other electronic device a link to the content to the device identified in the response to the second request or sends the content to the identified device or location in the response to the second request, wherein the other electronic device is configured to process the content independently and regardless of whether the originating electronic device is capable of processing the content.

14. The system of claim 13, wherein the device receiving the link to the content or the content itself is the same as or different than the originating electronic device.

15. A method for processing electronic documents for online marketing, comprising:
    marking an advertisement with a mobile code;
    reading by a mobile camera phone the mobile code to designate a computer server for content related to an object of interest that may be accessed and delivered electronically to a specified second electronic device;
    determining by a designated server if the mobile camera phone sends a first request for processing by the designated server and determining the content related to the object of interest to be received asynchronously with respect to the first request;
    sending by the designated server a second request to the mobile camera phone for identifying a service accessible by at least one electronic device or identifying another electronic device for receiving a link to content related to the marked advertisement or the content itself; and
    outputting by an out-of-band asynchronous electronic communication between the designated server and the specified other electronic device the link to the content or outputting the content itself to the identified service accessible by the at least one electronic device in the response to the second request or to the device identified in the response to the second request, wherein the other electronic device is configured to process the content independently and regardless of whether the mobile camera phone is capable of processing the content.

\* \* \* \* \*